(12) United States Patent
Cohen

(10) Patent No.: US 9,668,430 B2
(45) Date of Patent: Jun. 6, 2017

(54) FILTER CLEANING APPARATUS

(75) Inventor: Amir Cohen, Doar-Na Misgav (IL)

(73) Assignee: Amirim Products Development & Patents Ltd., Yuvalim (IL)

( * ) Notice: Subject to any disclaimer, the term of this patent is extended or adjusted under 35 U.S.C. 154(b) by 1183 days.

(21) Appl. No.: 13/280,472

(22) Filed: Oct. 25, 2011

(65) Prior Publication Data

US 2012/0097196 A1 Apr. 26, 2012

(30) Foreign Application Priority Data

Oct. 25, 2010 (GB) .................................. 1017985.1

(51) Int. Cl.
*A01G 25/02* (2006.01)
*F16K 17/28* (2006.01)
*B05B 15/02* (2006.01)

(52) U.S. Cl.
CPC ........... *A01G 25/02* (2013.01); *A01G 25/023* (2013.01); *B05B 15/0216* (2013.01); *F16K 17/28* (2013.01); *Y10T 137/0318* (2015.04); *Y10T 137/1624* (2015.04); *Y10T 137/5994* (2015.04); *Y10T 137/7791* (2015.04); *Y10T 137/87539* (2015.04)

(58) Field of Classification Search
CPC ...... A01G 25/02; A01G 25/023; B05B 15/02; B05B 15/0208; B05B 15/0216; B05B 15/0225; B05B 15/0233
See application file for complete search history.

(56) References Cited

U.S. PATENT DOCUMENTS

| 780,334 A | 1/1905 | Freeman |
| 3,348,694 A | 10/1967 | Smith |
| 3,523,559 A | 8/1970 | Gibson |
| 3,779,388 A | 12/1973 | Coughlin |
| 3,918,646 A | 11/1975 | Leal-Diaz et al. |
| 3,970,251 A | 7/1976 | Harmony |
| RE29,022 E | 11/1976 | Spencer |
| 4,032,072 A | 6/1977 | McElhoe et al. |
| 4,059,228 A | 11/1977 | Werner |

(Continued)

FOREIGN PATENT DOCUMENTS

| BE | 895982 | 8/1983 |
| EP | 1884157 | 2/2008 |
| WO | WO 2012/056448 | 5/2012 |

OTHER PUBLICATIONS

Restriction Official Action Dated Jun. 24, 2013 From the US Patent and Trademark Office Re. U.S. Appl. No. 13/881,401.

(Continued)

*Primary Examiner* — Jason Ko
*Assistant Examiner* — Spencer Bell

(57) ABSTRACT

There is provided a cleaning apparatus for unclogging an irrigation emitter inlet filter by dislodging or crushing or breaking a trapped solids. In some embodiments, a ram pushes the trapped solids out of a fluid inlet of the emitter. In other embodiment, a constriction provided for retaining a particle has a changeable interior cross section. By changing the cross section of the constriction, the constriction is unclogged. In alternative embodiments the filtration member may include two rigid members moving in relation one to the other or the filtration member may be elastic. In further alternate embodiments the cleaning may be activated automatically or manually.

17 Claims, 8 Drawing Sheets

(56) References Cited

U.S. PATENT DOCUMENTS

| | | | |
|---|---|---|---|
| 4,079,750 A | 3/1978 | Ludwig | |
| 4,196,753 A | 4/1980 | Hammarstedt | |
| 4,209,133 A | 6/1980 | Mehoudar | |
| 4,331,293 A | 5/1982 | Rangel-Garza | |
| 4,344,576 A | 8/1982 | Smith | |
| 4,428,397 A | 1/1984 | Bron | |
| 4,502,631 A | 3/1985 | Christen | |
| 4,527,595 A | 7/1985 | Jorgensen et al. | |
| 4,623,094 A | 11/1986 | Smeyers | |
| 4,682,730 A | 7/1987 | Smeyers | |
| 4,718,608 A | 1/1988 | Mehoudar | |
| 4,806,258 A | 2/1989 | Duncan | |
| 5,004,161 A * | 4/1991 | Antel | 239/542 |
| 5,183,208 A | 2/1993 | Cohen | |
| 5,279,462 A | 1/1994 | Mehoudar | |
| 5,400,973 A | 3/1995 | Cohen | |
| 5,413,282 A | 5/1995 | Boswell | |
| 5,609,303 A | 3/1997 | Cohen | |
| 5,615,838 A | 4/1997 | Eckstein et al. | |
| 5,634,594 A | 6/1997 | Cohen | |
| 5,820,029 A | 10/1998 | Marans | |
| 6,250,571 B1 | 6/2001 | Cohen | |
| 6,276,491 B1 | 8/2001 | Schoenfeld | |
| 6,302,338 B1 | 10/2001 | Cohen | |
| 6,986,532 B1 * | 1/2006 | King | 285/197 |
| 8,291,936 B2 | 10/2012 | Carmody et al. | |
| 2002/0047053 A1 | 4/2002 | Bron | |
| 2002/0070297 A1 | 6/2002 | Bolinis et al. | |
| 2005/0121401 A1 | 6/2005 | Walton et al. | |
| 2009/0029434 A1 | 1/2009 | Tsai et al. | |
| 2010/0163651 A1 | 7/2010 | Feith et al. | |
| 2011/0186652 A1 | 8/2011 | Cohen | |
| 2012/0097254 A1 | 4/2012 | Cohen | |
| 2013/0213905 A1 | 8/2013 | Cohen | |

OTHER PUBLICATIONS

Office Action Dated Jun. 26, 2013 From the Israel Patent Office Re. Application No. 215931 and Its Translation Into English.
Communication Pursuant to Article 94(3) EPC Dated Jul. 11, 2014 From the European Patent Office Re. Application No. 11794244.1.
International Preliminary Report on Patentability Dated May 10, 2013 From the International Bureau of WIPO Re. Application No. PCT/IL2011/000824.
International Search Report and the Written Opinion Dated May 23, 2012 From the International Searching Authority Re. Application No. PCT/IL2011/000824.
Official Action Dated Aug. 6, 2013 From the US Patent and Trademark Office Re. U.S. Appl. No. 13/881,401.
Notice of Allowance Dated Oct. 9, 2014 From the US Patent and Trademark Office Re. U.S. Appl. No. 13/881,401.
Official Action Dated Jun. 24, 2014 From the US Patent and Trademark Office Re. U.S. Appl. No. 13/881,401.
Communication Under Rule 71(3) EPC Dated Jul. 23, 2013 From the European Patent Office Re. Application No. 11186539.0.
Patents Act 1977: Patents Rules 2007 Report Under Section 15A Dated Oct. 28, 2010 From the Intellectual Property Office of the United Kingdom Re. Application No. GB1017985.1.
Patents Act 1977: Search Report Under Section 17(5) Dated Feb. 11, 2011 From the Intellectual Property Office of the United Kingdom Re. Application No. GB1017985.1.
Official Action Dated Oct. 20, 2014 From the US Patent and Trademark Office Re. U.S. Appl. No. 13/280,476.
Communication Pursuant to Article 94(3) EPC Dated Nov. 30, 2012 From the European Patent Office Re. Application No. 11186539.0.
Advisory Action Before the Filing of an Appeal Brief Dated Mar. 4, 2014 From the US Patent and Trademark Office Re. U.S. Appl. No. 13/881,401.
Communication Pursuant to Article 94(3) EPC Dated Feb. 12, 2014 From the European Patent Office Re. Application No. 11794244.1.
Office Action Dated May 12, 2014 From the Israel Patent Office Re. Application No. 215931 and Its Translation Into English.
Applicant-Initiated Interview Summary Dated Oct. 31, 2013 From the US Patent and Trademark Office Re. U.S. Appl. No. 13/881,401.
Official Action Dated Nov. 21, 2013 From the US Patent and Trademark Office Re. U.S. Appl. No. 13/881,401.
Communication Pursuant to Rules 70(2) and 70a(2) EPC and Reference to Rule 39(1) EPC Dated May 2, 2012 From the European Patent Office Re. Application No. 11186539.0.
European Search Report and the European Search Opinion Dated Feb. 23, 2012 From the European Patent Office Re. Application No. 11186539.0.
Notice of Allowance Dated Jan. 29, 2015 From the US Patent and Trademark Office Re. U.S. Appl. No. 13/280,476.
Office Action Dated Jan. 20, 2015 From the Israel Patent Office Re. Application No. 215931.
Patents Act 1977: Examination Report Under Section 18(3) Dated Jan. 16, 2015 From the Intellectual Property Office of the United Kingdom Re. Application No. GB1017985.1.
Translation Dated Feb. 9, 2015 of Office Action Dated Jan. 20, 2015 From the Israel Patent Office Re. Application No. 215931.
Communication Pursuant to Article 94(3) EPC Dated Apr. 20, 2015 From the European Patent Office Re. Application No. 11794244.1.
Communication Pursuant to Article 94(3) EPC Dated Aug. 11, 2016 From the European Patent Office Re. Application No. 11794244.1.

* cited by examiner

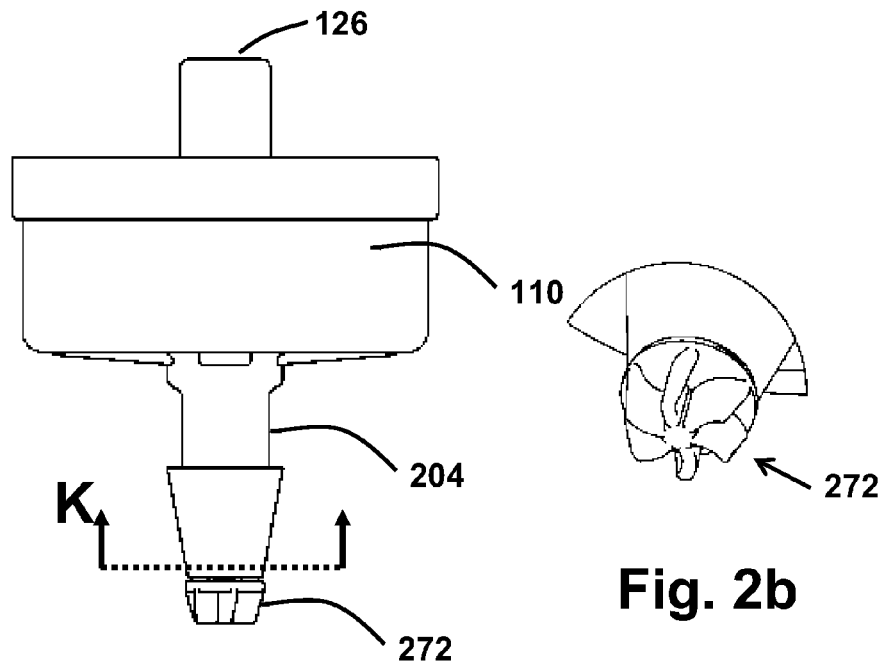
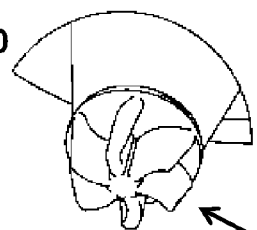
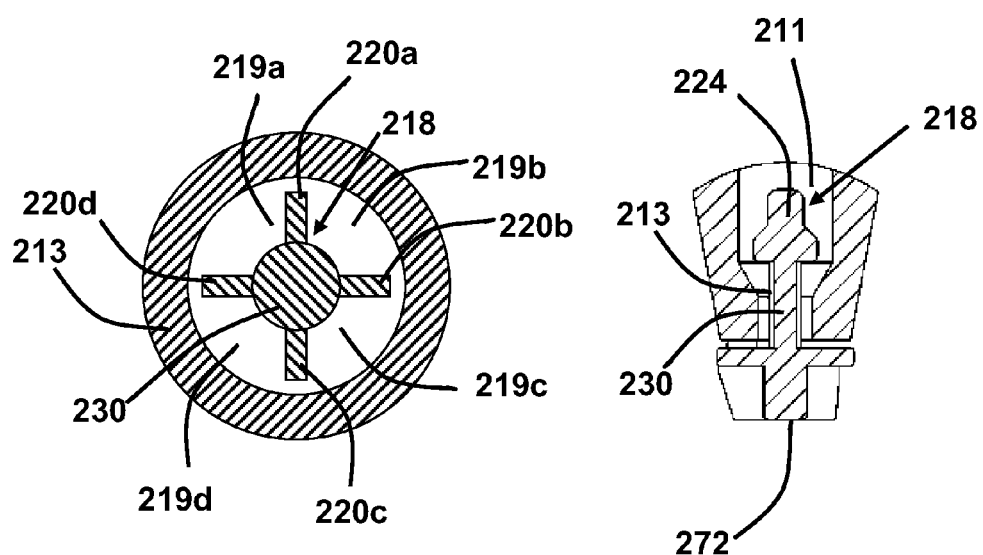

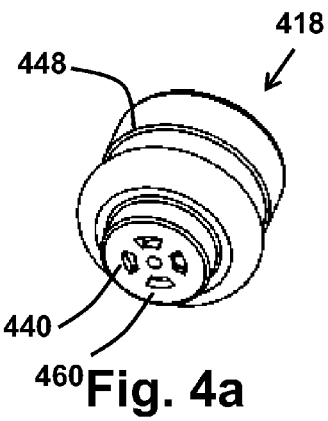
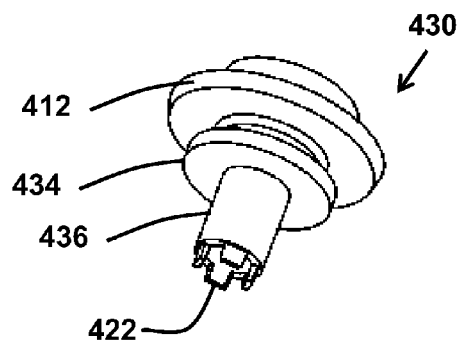
Fig. 4a
Fig. 4b
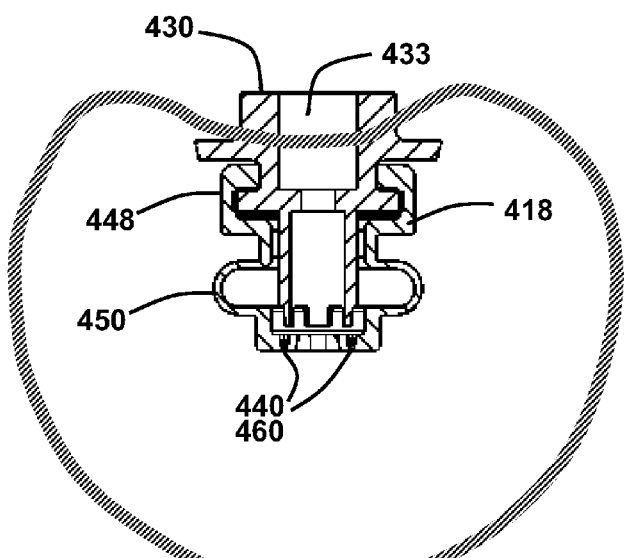
Fig. 4c
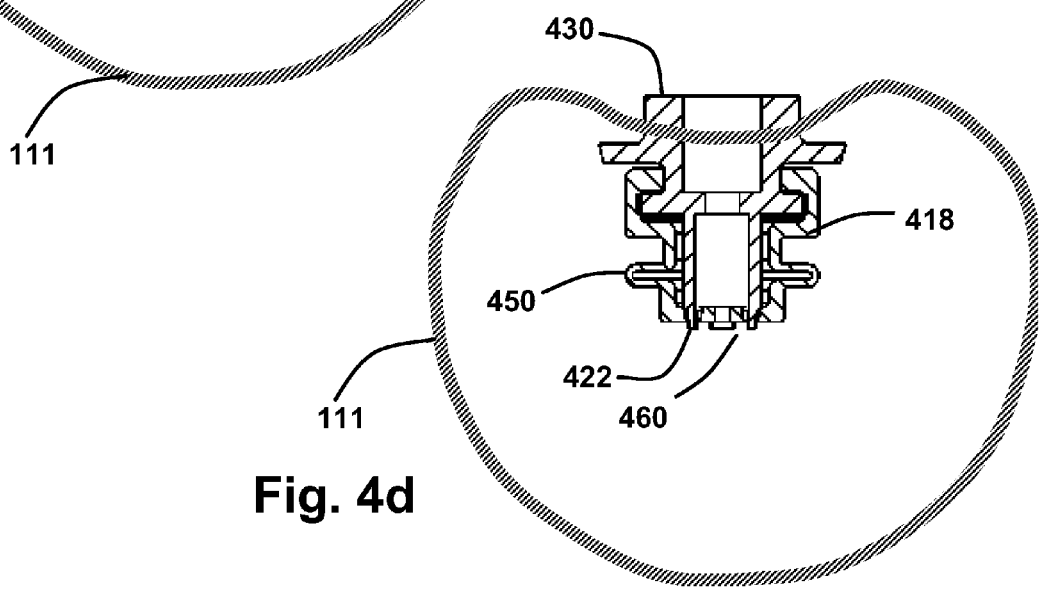
Fig. 4d

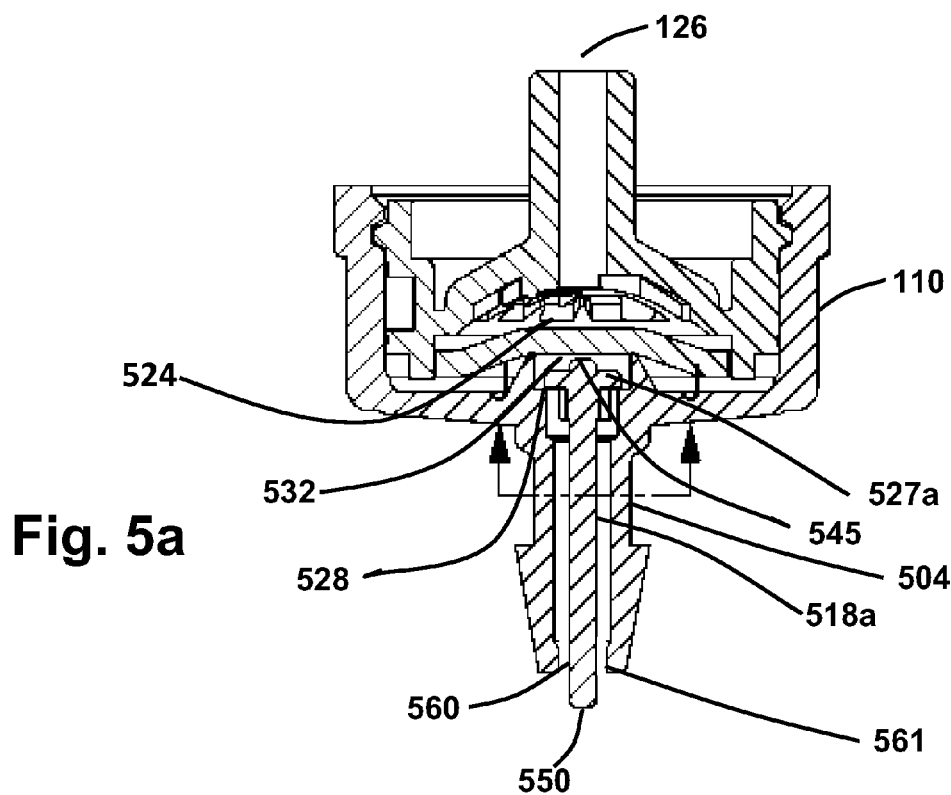
Fig. 5a
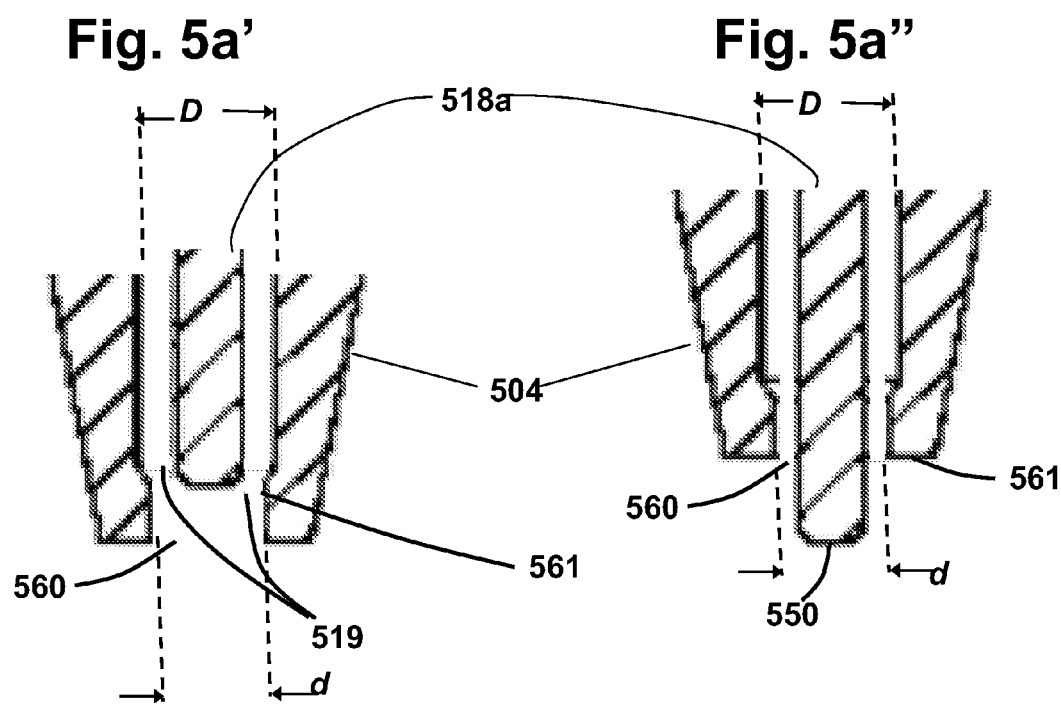
Fig. 5a'  Fig. 5a"

FILTER CLEANING APPARATUS

RELATED APPLICATION

This application claims priority from GB Patent Application No. GB1017985.1, the contents of which are incorporated by reference as if fully set forth herein.

FIELD AND BACKGROUND OF THE INVENTION

The present invention, in some embodiments thereof, relates to a filter cleaning apparatus, more particularly, but not exclusively, to an apparatus unclog an irrigation emitter inlet filter by pushing out, freeing, dislodging, crushing or breaking trapped particles and solid deposits.

With population increase and climate changes, water resources became more scarce, forcing farmers and gardeners to save water and direct irrigation to a close vicinity of target plants. Such a directional irrigation is achieved by drip emitters, fed by an irrigation pipe of relatively high water pressure.

Sometimes, dirt accumulates in the emitter and undesired flow restriction up to flow stopping occurs. To prevent entrance of dirt, the inlet opening may be shaped for filtering the water. However, while such a static filtering reduces dirt entrance to the emitter, the filter itself may become clogged. Once clogging due to dirt or calcium deposits occurs, there is a need to clear barely accessible fine water passageways. Due to the small size and low price of the emitter and its connections, complex conventional valve systems for cleaning or backwashing filters are not feasible. Therefore, it is generally necessary to replace the whole emitter.

U.S. Pat. No. 4,623,094 to Smeyers, discloses an internal notch filter that can be rinsed so that the particles retained by filtering notches are removed through the outlet by the flushing with the liquid. Smeyers also teaches a pre-filter having a diameter that is larger than the diameter of the inlet. When the dripper is in use, the prefilter is applied against the entrance of the inlet and filters the large impurities contained in the liquid admitted into the dripper. When the dripper is not in use, the pre-filter is removed from the free end of the inlet. The pre-filter may consist of a sieve or diametral bars which stop large particles, such as vegetable fragments, from entering into the dripper.

U.S. Pat. No. 4,331,293 to Rangel-Garza teaches a micro-filter formed in the extreme lower part of a bored nipple pivot. Because of its location inside the hoses of dripper or sprinkling lines, the micro-filter will stop the particles which are in the flow of water from entering into the inside of the emitter, avoiding the obstruction of the emitter and at the same time, permitting all of the particles which could not enter into the emitter and which stayed in the dripper of sprinkling hoses, to be easily dislodged upon flushing the lines at their extreme ends, during the normal maintenance of the irrigation systems.

Additional background art includes U.S. Pat. No. 4,059,228 to Werner and European application EP1884157 to Schiedt and Belgian patent application BE895982.

SUMMARY OF THE INVENTION

A mechanical filter cleaner may remove trapped particles from a filter at the inlet tip of an irrigation emitter. Trapped particles may include for example, particles that are trapped due to geometry (for example a particle that is too big to pass through a channel) or due to adhering (for example material that is deposited and/or precipitated and/or sorbed onto parts of the filter). Removing a particle can include for example crushing the particle, grinding the particle, pushing the particle out of the emitter and/or washing the particle out of the emitter.

In one embodiment, a ram may push solids trapped in emitter out a fluid inlet of the emitter and/or crush the solids.

Alternatively, or additionally the filter may include a constriction that traps a particle. The geometry of the cross section of the constriction may be changed thereby releasing the particle. Alternatively, changing the cross sectional geometry may crush or grind the particle and the small pieces may be washed out the emitter outlet.

According to an aspect of some embodiments of the present invention there is provided an apparatus for clearing a solid trapped in an inlet filter integrated to an on-line drip irrigation emitter. The apparatus may include a fluid inlet, and a ram moveably disposed with respect to the fluid inlet. The ram may be configured for ejecting the solid out from the fluid inlet.

According to some embodiments of the invention, the apparatus may further include a conduit. The fluid inlet may be the entrance to the conduit. The apparatus may also include a narrow channel configured for filtering a particle from a fluid. The narrow channel may be formed between a tip of the ram and an inner surface of the conduit.

According to some embodiments of the invention, the apparatus may further include a cylindrical body. The ram may include an elongated member rigidly attached to the cylindrical body and an outlet of the conduit may be moveably attached to the cylindrical body via a screw thread. The apparatus may further include a handle for moving the conduit with respect to the cylindrical body via human manipulation thereby moving the ram longitudinally along the conduit.

According to some embodiments of the invention, the conduit may include a constriction near the fluid inlet.

According to some embodiments of the invention, the ram may narrow toward the fluid inlet.

According to some embodiments of the invention, the apparatus may further include a slender projection from the tip of the ram. The narrow channel may be formed between the slender projection and a constriction of the conduit.

According to some embodiments of the invention, the apparatus may further include a handle for manually moving the ram in respect to the fluid outlet.

According to some embodiments of the invention, the ram may be configured for moving automatically.

According to some embodiments of the invention, the ram may be configured for moving due to interaction with a fluid.

According to some embodiments of the invention, the apparatus may further include an elastic cup. The inlet may include a slot in the elastic cup.

According to some embodiments of the invention, the ram may be further configured for closing the fluid inlet.

According to some embodiments of the invention, the ram is configured to rotate with respect to the fluid inlet.

According to some embodiments of the invention, the ram is configured to move linearly with respect to the fluid inlet.

According to an aspect of some embodiments of the present invention there is provided an apparatus for clearing a trapped solid from an inlet filter integrated to an on-line drip irrigation emitter. The apparatus may include a conduit, and a constriction of the conduit. The constriction may have a changeable interior cross section.

According to some embodiments of the invention, the apparatus may also include a handle for human manipulation of the changeable cross section.

According to some embodiments of the invention, the apparatus may also include a body, and the conduit may be movably connected to the body. The apparatus may also include an elongated member rigidly connected to the body, the elongated member extending into the conduit. Human manipulation may move the conduit with respect to the body thereby changing the inherent geometry of the interior cross section of the conduit.

According to some embodiments of the invention, the apparatus may also include a boss rigidly connected to the conduit.

According to some embodiments of the invention, the constriction may include a deformable boundary and the changing of the cross section may result from a deformation of the deformable boundary.

According to some embodiments of the invention, the constriction may include a slot in an elastic wall.

According to some embodiments of the invention, the inherent geometry of the changeable interior cross section is changeable.

According to an aspect of some embodiments of the present invention there is provided an apparatus for clearing a solid trapped in an inlet filter integrated into an on-line drip irrigation emitter. The apparatus may include a fluid inlet, and a ram moveably disposed with respect to the fluid inlet. The ram may be configured for ejecting the solid out from the fluid inlet. The apparatus may also include a conduit and the fluid inlet may be an entrance to the conduit. The apparatus may also include a narrow channel configured for filtering the solid from a fluid. The narrow channel may be formed between a tip of the ram and an inner surface of the conduit. The apparatus may also include a cylindrical body. The ram may include an elongated member rigidly attached to the cylindrical body. An outlet of the conduit may be moveably attached to the cylindrical body via a screw thread. The apparatus may further include a handle for moving the conduit with respect to the cylindrical body via human manipulation thereby moving the ram longitudinally along the conduit.

According to an aspect of some embodiments of the present invention there is provided an apparatus for clearing a trapped solid from an inlet filter integrated into an on-line drip irrigation emitter. The apparatus may include a conduit, and a constriction of the conduit. The constriction may have a changeable cross section. The apparatus may also include a handle for human manipulation of the changeable cross section. The apparatus may also include a body. The conduit may be movably connected to the body. The apparatus may also include an elongated member rigidly connected to the body. The elongated member may extend into the conduit. The apparatus may also include a boss rigidly connected to the conduit at the constriction. Human manipulation of the handle may include moving the conduit with respect to the body and thereby moving the elongated member with respect to the boss.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2a is a schematic view of an emitter having an external turbine;

FIG. 2b is a perspective close up view of an external turbine;

FIG. 2c is a longitudinal cross sectional view of the tip of an emitter inlet having an external turbine;

FIG. 2d is a transverse cross sectional view of a constriction of a conduit having a self-rotating member;

FIG. 4a is a perspective view of an elastic walled cup filter element;

FIG. 4b is a perspective view of a mounting member having rams for an elastic walled cup filter element;

FIG. 4c is a cross sectional view of an elastic walled cup filter element and mounting member installed in an irrigation hose in a filtering pose;

FIG. 4d is a cross sectional view of an elastic walled cup filter element and mounting member installed in an irrigation hose in a cleaning pose;

FIG. 5a is a cross sectional view of an automatically activated ram filter cleaner integrated into an emitter;

FIG. 5a' is a close up cross sectional of a filter tip in a filtering pose;

FIG. 5a" is a close up cross sectional of a filter tip in a cleaning pose;

FIG. 6a' is a close up cross sectional view of a conduit and a manually activated ram in a closed pose;

DESCRIPTION OF SPECIFIC EMBODIMENTS OF THE INVENTION

Figure 1A:
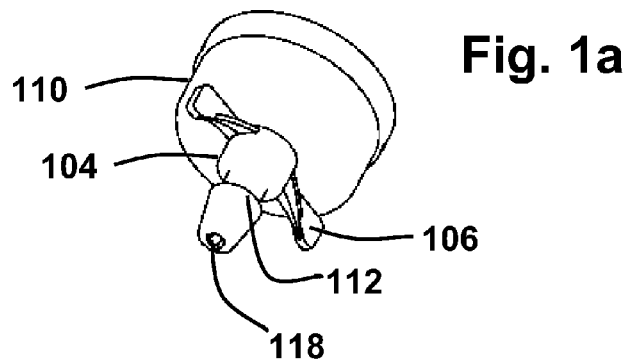
FIG. 1a is a bottom perspective view of an inlet filter having a manually changeable cross section.
Figure 1B:
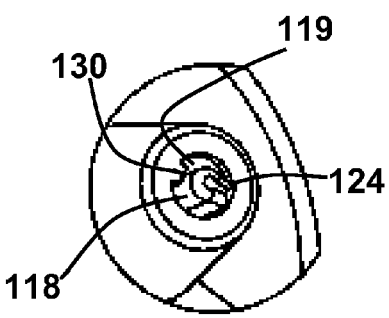
FIG. 1b is a bottom perspective close up view of the filter inlet.

The present invention, in some embodiments thereof, relates to a filter cleaning apparatus, more particularly, but not exclusively, to an apparatus unclog an on line irrigation emitter inlet filter by pushing out, freeing, dislodging, crushing and/or breaking trapped particles and solid deposits.

Inlet filter for an agricultural emitters often include a narrow channel to allow water and very fine particles of, for example, less than 0.2 mm to flow to the emitter while trapping large particles, of, for example, 0.30-0.50 mm and above. Generally, these narrow channels have a maximum opening of 0.30-0.50 mm, depending on the emitter outlet flow rate and minimum size of the restricted path. The dimensions may change according to the application and/or design of the emitter and/or filter. The filter may become clogged by solid material. Such solids include particles trapped inside or at the entrance to the channel and also solid deposits due to precipitation of dissolved minerals. A moving element may be supplied to unclog the filter by dislodging, breaking or crushing trapped solids. Operation of the moving element may not require disassembling of the emitter. The cleaning action may occur constantly, or periodically due to manual cleaning, or only while water is flowing through the emitter, or at the initiation of flow, or at the cessation of flow, or as a result of filter clogging.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Releasing a Particle by Changing a Cross Section:

In some embodiments described below, the moving element may unclog a narrow channel by changing a cross section of the channel. In examples described below, the moving element may be a solid object projecting into the channel. The projecting element may be moved manually by a person or by interaction with the fluid. In other embodiments described below, the moving element may include a deformable boundary of the narrow channel. Changing a cross section may include changing the inherent geometry or dimensions of the channel or changing a cross section may include changing only the orientation of parts one to another. The narrow channel may be located near (within 2 mm of) the fluid inlet of the conduit.

Ramming Trapped Particles Out a Fluid Inlet:

In some embodiments described below, the moving element may be a ram that unclogs the channel by pushing trapped solids out the fluid inlet of the emitter. In one such embodiment, the inlet of the emitter is a conduit and the narrow filtering channel is formed between an interior boundary of the conduit and the ram. Particles stuck to the interior boundary of the conduit may be pushed by the ram tip out the inlet. In addition, particles caught inside the narrow channel are dragged between the ram and the side of the conduit towards the inlet and crushed or released as the ram exits the inlet.

Movement of the ram may be due to a manual force, for example, a person may force the ram by pushing or by turning a screw. Optionally or alternatively, movement of the ram is automatic, for example, being driven by interaction with the fluid.

Embodiments Including Changing a Cross Section of a Narrow Channel

FIGS. 1a-g, 2a-c, 3a-f, 4a-d illustrate alternate embodiments of agricultural emitter input filter devices including narrow channels whose cross section can change in order unclog the filter.

Changes Caused by Manual Movement of a Solid Projection

Referring now to the drawings, FIGS. 1a-f illustrate an example of a manually operated apparatus for unclogging an inlet filter by changing a cross section of a narrow channel 119. The change in the cross section is optionally achieved by rotating a rotationally asymmetric member inside of a conduit.

In the example FIGS. 1a-g, a cylindrical elongated member 118 is rotatably disposed along and coaxial to a cylindrical conduit 104. As can be seen in enlarged tip perspective view of FIG. 1c, rotational symmetry may be broken, for example, by a bar 124 rigidly mounted to elongated member 118 and by a boss 130 rigidly connected to conduit 104.

Figure 1C:
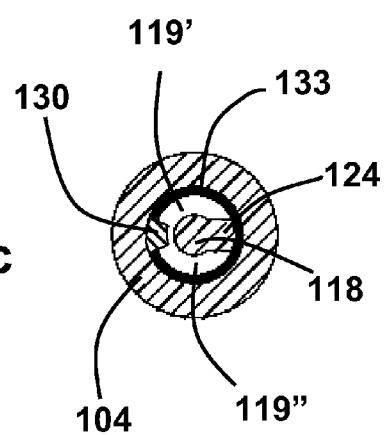
FIG. 1c is a sectional view of the conduit of the emitter along line L-L of FIG. 1g.

As illustrated in cutaway cross sectional view FIG. 1c, rotation of elongated member 118 within conduit 104 causes bar 124 to sweep around an internal wall 133 of conduit 104. Both the movable element (elongated member 118 and attached bar 124) and the fixed element (conduit 104 and attached boss 130) are asymmetrical. Therefore, rotation of the movable element changes the inherent geometry and dimensions of the cross section (and not just the orientation as for example in case of the rotatable element of FIGS. 2a-d). In the example of FIG. 1c, rotating elongated member 118 clockwise changes the cross section of narrow channel 119 by enlarging an upper semi annular section 119' and by shrinking a lower semi annular section 119". Solids in upper annular section 119' are freed by the expansion while solids stuck to internal surface 133 in the lower section 119" are swept toward boss 130 and eventually washed away or crushed against boss 130.

Perspective view 1a illustrates a cylindrical main body 110, which is integrally attached to a drip irrigator (not shown). Elongated member 118 is rigidly mounted to main body 110. Thus, in order to unclog narrow channel 119, a user rotates main body 110 (and elongated member 118 which is rigidly attached thereto) while keeping conduit 104 stationary by holding a handle (wings 106).

Figure 1D:
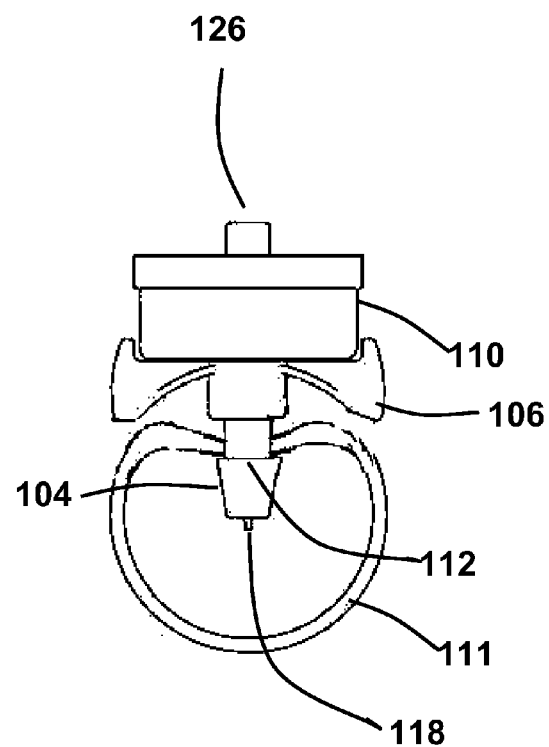
FIG. 1d is an illustration of the emitter installed into an irrigation tube.

FIG. 1d illustrates a frontal view of the assembled emitter connected to a source of pressurized fluid, a pipe 111. Conduit 104 penetrates a pipe 111, and a step 112 prevents elimination of conduit 104 from pipe 111. Water is emitted via an outlet 126.

Figure 1E:
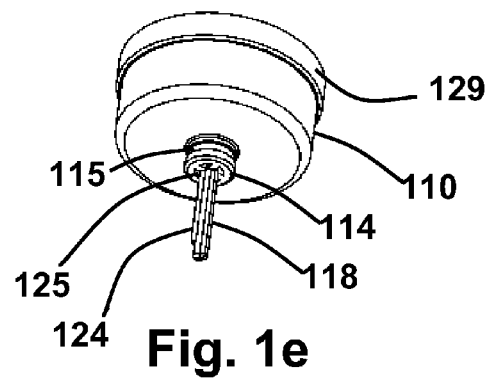
FIG. 1e is a perspective view of the main body of the emitter having a receiving port with an extended elongated member.
Figure 1F:
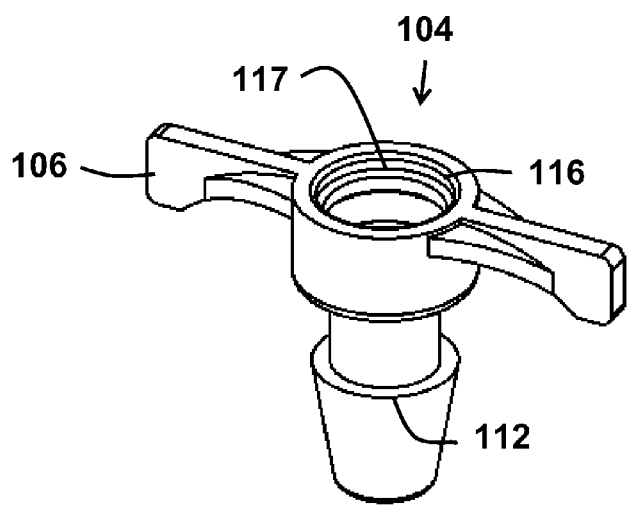
FIG. 1f is a perspective view of a conduit having holding wings.

In order to better understand the assembly of the example of FIGS. 1a-g, FIGS. 1e and 1f illustrate perspective views of main body 110 and conduit 104 respectively. A receiving port 114 extends from main body 110 to facilitate connection to conduit 104. Port 114 has several openings 125 for water communication with an outlet 117 of conduit 104. Port 114 and conduit 104 have respective circumferential couplers 115 and 116 for sealingly rotatable mutual coupling. In FIGS. 1e and 1f, respectively, coupler 115 is a groove and coupler 116 is a corresponding circular ridge, which may slide in groove 115 in a rotational movement while sealing the connection in between.

Figure 1G:
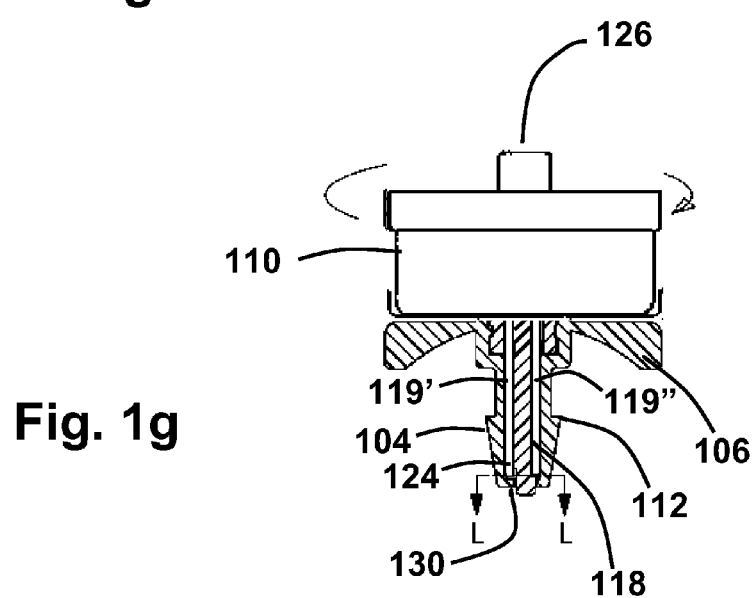
FIG. 1g is a sectional view of the filter attached to an emitter.

FIG. 1g shows a cut out view of conduit 104 assembled to main body 110.

Changes Caused by Interaction of a Solid Projection with Fluid

Four alternative self-movable filter tip cleaning elements are illustrated in FIGS. 2a-d, FIGS. 3a-f, FIGS. 4a-d and FIGS. 5a-e. In each case, interaction with fluid produces a force on a movable element, which cleans the filter tip.

FIGS. 2a-d illustrate an example of a self-rotating element filter tip cleaner. Fluid causes a self-rotating element 218 to rotate inside a constriction 213 near the tip of a conduit 204. Rotation of element 218 unclogs filtering passageways.

A cutaway cross sectional view is illustrated in FIG. 2d (cut along like K of FIG. 2a). In the example of FIG. 2d, self-rotating element 218 has a cylindrical spine 230 and four ribs 220a, 220b, 220c and 220d. Four narrow channels 219a, 219b, 219c, and 219d are formed between element 218 and the inner walls of constriction 213. When element 218 rotates, the orientation of channels 219a-d is rotated and ribs 220a-d scrape away any particles or precipitated solids that have formed on the inner walls of constriction 213.

Rotation of element 218 is driven by a turbine 272 inserted into the source of pressurized fluid (for example pipe 111, not shown). Constriction 213 is near (within 2 cm) to a fluid inlet which is coupled to the source of pressurized fluid. Self-rotating element 218 has a substantially cylindrical part 224 disposed within conduit 204 in a wide hole 211. Spine 230 is disposed within constriction 213 and connects cylindrical part 224 to turbine 272. Fluid flow in pipe 111 (not shown) rotates turbine 272 and thereby rotates self-rotating element 218. Rotation of element 218 within conduit 204 prevents dirt accumulation therein. Self-rotating element 218 continues to clean the filter as long as there is flow in the fluid source, even when there is no flow through the emitter.

Changes Caused by Flexing of a Deformable Boundary

FIGS. 3a-f illustrate an example of an embodiment of an apparatus for unclogging an agricultural emitter inlet filter by deformation of a boundary of a narrow filtering channel.

Particularly, in the embodiment of FIGS. 3a-f, slots 340, 342, and 360 in an elastic filtering element 318 serve as narrow filtering channels. Interactions with the fluid (changes is pressure or flow) cause element 318 to flex. Flexing of element 318 causes slots 340, 342, and 360 to deform thereby unclogging the slots (for example by breaking off calcified deposits or stretching the opening to free trapped particles).

Figure 3A:
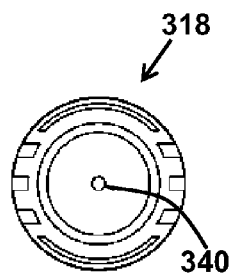
FIG. 3a is a schematic bottom view of an elastic walled cup filter element.
Figure 3B:
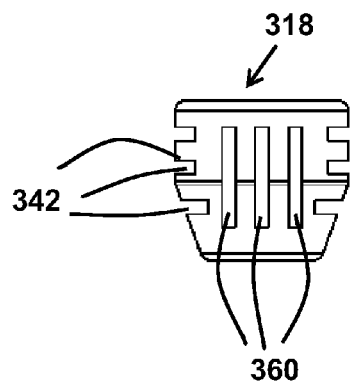
FIG. 3b is a schematic side view of an elastic walled cup filter element.

FIGS. 3a and 3b illustrate a bottom and side view (respectfully) of an example of elastic cup filtering element 318. Filtering element 318 has narrow filtering channels including a circular slot 340 in the bottom wall of the cup, transversal slots 342 in the side wall of the cup, and longitudinal slots 360 in the side wall of the cup. Large particles do not pass through slots 340, 342 and 360 and are washed away from the filter by external fluid flow. Very small particles (that are small to pass through the emitter without causing damage) pass freely through slots 340, 342 and 360. Particles in an intermediate size range (which are too big to pass freely through slots but small enough to pass through the emitter without causing damage) may get trapped in the filter. In general, the maximum particle size allowed through the filter will be related to the critical discharge of the emitter. For example for emitters having critical discharge in the range of 2-7 l/hr the maximum particle size allowed to pass the filter can be, for example, 0.3-0.5 mm. When these intermediate sized particles gets trapped in filtering element 318, changes in static and dynamic fluid pressure across filtering element 318 causes filtering element 318 to flex. Flexing of filtering element 318 changes the cross section of slots 340, 342 and 360 thereby releasing the particles (which are then washed into and through the emitter).

Flexing of filtering element 318 may break off calcified deposits by at least few mechanisms. For example, the rigid deposits calcium deposits cannot stick to the deforming boundaries of slots 340, 342, and 360. Furthermore, as element 318 flexes, slots 340, 342, and 360 scrape and bang against a hard mounting member 330 thereby braking and freeing trapped solids. Similarly as element 318 flexes, the cross sectional geometry of slots 340, 342 and 360 changes and calcified deposits are scraped and pushed off by opposing walls of slots 340, 342 and 360.

Figure 3C:
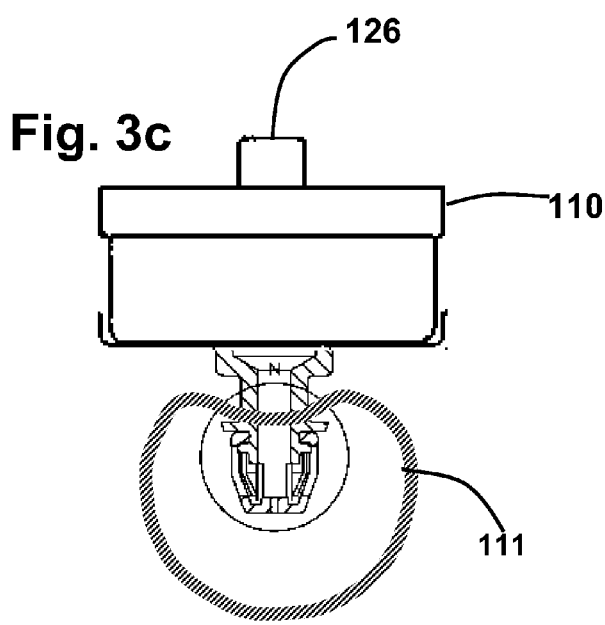
FIG. 3c is a cross sectional view of an elastic walled cup filter element and mounting member installed in an irrigation hose and attached to an emitter.
Figure 3D:
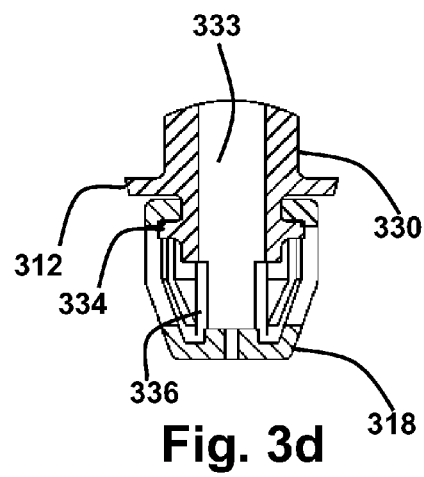
FIG. 3d is a close up cross sectional view of an elastic walled cup filter element and mounting member.

FIGS. 3c and 3d illustrate an example of elastic filtering element 318 mounted on an on line drip irrigation emitter. The emitter includes a body member 110 with an integral emitter (not shown). Mounting member 330 and body member 110 are integrally formed of a rigid material, polyethylene for example. Mounting member 330 is designed for insertion into agricultural pipe 111 (FIG. 3c). A step 312 holds mounting member 330 in pipe 111 while a ring shoulder 334 prevents elimination of element 318 from member 330. A support member 336 keeps filtering element 318 extended into the pipe 111. Body member 110 also includes flow-restrictors (not shown) communicating member 330 with emitter outlet 126, and restricting the flow there between.

Upon clogging of the fluid filtering paths (slots 340, 342 and 360), the pressure on the internal surface of filtering element 318 decreases. A pressure differential is produced across the elastic walls of filtering element 318 between the pressure in an internal channel 333 and the pressure in pipe 111. The pressure differential induces shape changes of slots 340, 342 and 360, thereby unclogging the filter as explained above. Elastic filtering element 318 may be made for example of thermoplastic elastomer or rubber or silicon.

Figure 3E:
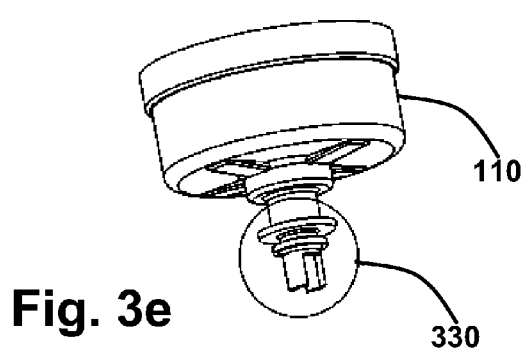
FIG. 3e is a perspective view of mounting member attached to an emitter.
Figure 3F:
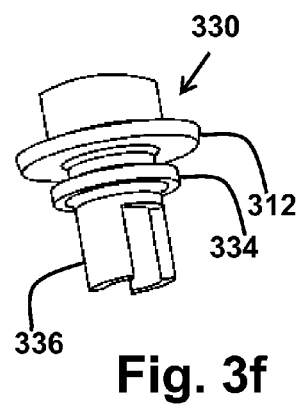
FIG. 3f is a close up perspective view of mounting member.

FIG. 3e illustrates in perspective view mounting member 330 attached to emitter body 110. FIG. 3f illustrates a close up perspective view of mounting member 330.

Ramming Trapped Particles Out a Fluid Inlet:

In some embodiments, a ramming element pushes trapped solids out of the fluid inlet of the emitter. In some embodiments, ramming may be combined with changes in the cross section of a narrow filtering channel. Ramming may be activated manually or automatically by interaction with a fluid. Automatic cleaning may be activated by the initiation flow or by the cessation of flow, or as a result of filter clogging.

Ramming Activated by Interaction with Fluid

FIGS. 4a-d illustrate a possible embodiment of an apparatus for unclogging a filter both by deformation of a narrowing filtering channel and also by ram pushing trapped particles out of a fluid inlet.

The embodiment of FIGS. 4a-d has an aspect similar to the embodiment of FIGS. 3a-f; in that changes in fluid pressure flex an elastic filter element 418 unclogging filtering channels (slots 440). Additionally, the embodiment of FIGS. 4a-d includes slender projections 422. When elastic element 418 flexes, projections 422 ram trapped solid material out from a fluid inlet 460 of the filtering channels into the fluid source.

FIG. 4a illustrates an embodiment of a filtering element 418, which has the form of an elastic walled cup. Four inlet slots 440 are located in the bottom wall of element 418. Inlet slots 440 are narrow channels that allow water to enter an agricultural emitter (not shown) while blocking particles.

Elastic walled cup filtering element 418 fits over a mounting member 430. FIG. 4b illustrates an embodiment of mounting member 430. A ring shoulder 434 is provided to fasten filtering element 418 to mounting member 430. Fastening is achieved by binding a ring 448 of filtering element 418 around ring shoulder 434.

FIGS. 4c and 4d illustrate filtering element 418 assembled to mounting member 430 and inserted into agricultural pipe 111. A step 412 holds mounting member 430 in pipe 111.

In FIG. 4c, filtering element 418 is shown in an extended pose. In the extended pose, slots 440 are in communication with a channel 433 through mounting member 430. Thus slots 440 and channel 433 make up a conduit for fluid from tube 111 to reach an emitter (not shown).

Mounting member 430 includes a support member 436 and projections 422, which act as rams to push trapped particles out of inlet slots 440 into pipe 111. This occurs when slots 440 in filter element 418 become clogged as illustrated in FIG. 4d.

FIG. 4d illustrates what may happen when slots 440 become clogged. Clogging prevents high-pressure fluid from pipe 111 from entering filter element 418. As a result, the pressure inside channel 433 decreases below the pressure in pipe 111. The high external pressure collapses a collapsible ring 450 into a contracted pose. In the contracted pose, slots 440 are drawn over projections 422. Projections 422 penetrate slots 440 and ram solids accumulated therein out of fluid inlet 460 (the eternal face of slots 440) into pipe 111.

Once slots 440 are clear, water enters slots 440 from pipe 111. This increases the fluid pressure inside mounting member 430 reinflating collapsible ring 450 into its natural shape as illustrated in FIG. 4c.

FIGS. 5a-e illustrate a possible embodiment of an apparatus for unclogging a filter tip. In this embodiment, a self-moving element (e.g. a ram 518a, 518b, or 518c) is variable in pose within a conduit 504. The pose variations include longitudinal displacement and rotation. Pose variations change a cross section of a narrow filtering channel and also push trapped solids out of a fluid inlet 560.

In the example of the embodiment of FIGS. 5a-e, movement of ram 518a, b, or c is driven by interaction with fluid. Longitudinal ramming motion may be driven by the effect of pressure changes on an elastic membrane 532. Changes of the cross section may be driven by interaction of the fluid with a turbine 572b or 527c.

FIG. 5a illustrates one possible embodiment of self-moving ram 518a integrated with a flexible membrane 532 of a flow restrictor 524 in an unstressed state. In its unstressed state, a flexible membrane 532 is biased towards fluid inlet 560. Consequently, in the unstressed state, membrane 532 pushes ram 518a toward fluid inlet 560. As a result, in the unstressed state, a tip 550 of ram 518a extends out of fluid inlet 560 (as illustrated in FIG. 5a").

During operation of the emitter, fluid pressure at inlet 560 of conduit 504 is greater than fluid pressure at emitter outlet 126. The pressure differential causes membrane 532 to flex toward flow restrictor 524. The fluid pressure also and pushes a shoulder 527a of self-moving ram 518a towards a flexible membrane 532. As a result self-moving ram 518a moves longitudinally up conduit 504 and ram tip 550 is retracted into conduit 504 (as shown in FIG. 5a'). While ram tip 550 is in the retracted pose, fluid can flow through a narrow channel 519.

Upon cessation of operation, water pressure is reduced at inlet 560 thereby reducing the pressure differential between inlet 560 and outlet 126. This allows membrane 532 to relax and push against ram 518a. As a result, ram 518a slides down conduit 504 extending ram tip 550 out inlet 560. As ram tip 550 passes through inlet 560 it grinds and breaks away solids trapped in the narrow channel 519 and it ejects some of them out inlet 560 into the fluid source (for example pipe 111).

In the example of embodiments of FIGS. 5a-e conduit 504 is integrally formed with body 110, which is a housing for integral flow restrictor 524

Figure 5B:
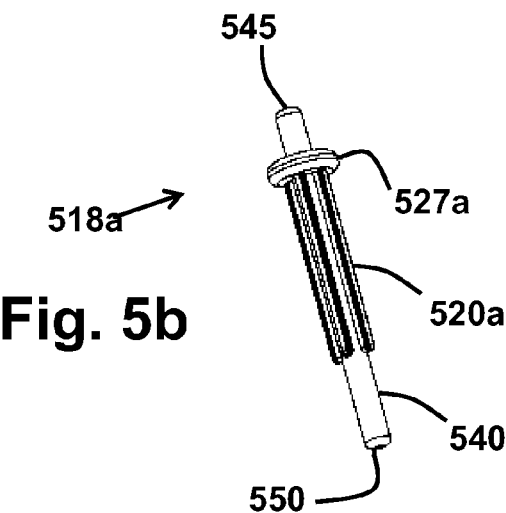
FIG. 5b is a perspective view of a first embodiment of an automatically activated ram.
Figure 5C:
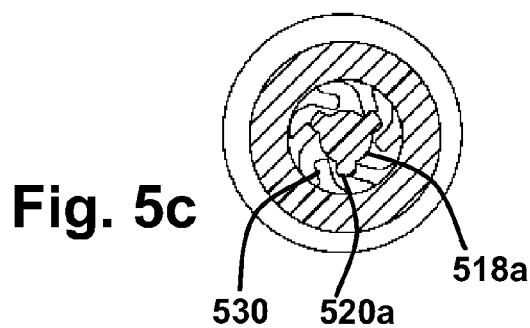
FIG. 5c is a cross sectional view of a second embodiment of a conduit and an automatically activated ram.

FIG. 5b and FIG. 5c show an embodiment of self-moving ram 518a with a central rod 540 and three elongated alignment wings or ribs 520a. FIG. 5c depicts a sectional view of the emitter along line J-J of FIG. 5a, showing ribs 520a within a conduit 504 which has projections 530 for filtering the inlet flow.

Central rod 540 has a head 545 nearby membrane 532. In the example of FIG. 5a, the internal diameter of conduit 504 decreases from a diameter D for example between 2.0-4.0 mm to a constriction 561 of diameter d for example 1.5-3.5 mm at inlet 560.

Figure 5D:
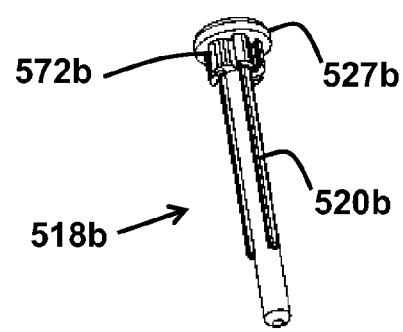
FIG. 5d is a perspective view of a second embodiment of an automatically activated ram.
Figure 5E:
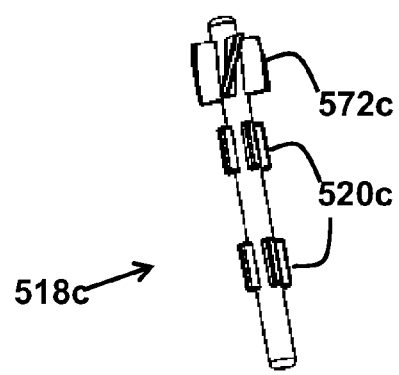
FIG. 5e is a perspective view of a third embodiment of an automatically activated ram.

In alternative embodiments, self-moveable ram 518a may be replaced by self-moveable rams 518b or 518c of FIGS. 5d and 5e. Rotational change of the pose of the self-moveable rams 518b,c and alignment ribs 520b and 520c may change the in internal cross section of conduit 504. Turbines 572b and 572c interact with the water flow within conduit 504 to rotate the self-movable rams 518a,b. While self-rotating ram 518b rotates, a cylindrical shoulder 527b which slides on circular base 528 of housing 502. Alignment ribs 520b centralize ram 518b within conduit 504.

In the alternative design of FIG. 5e, turbine 572c has relatively broad wings slopped relative to a rotational axis of self-moveable ram 518c and two sets of alignment ribs 520c.

Ramming Activated Manually

In some embodiments, a manually activated ram may clean an agricultural emitter tip filter by pushing trapped particles out of a fluid inlet and also can shut down the emitter flow. An example of such an apparatus is illustrated in FIGS. 6a-c.

Figure 6A:
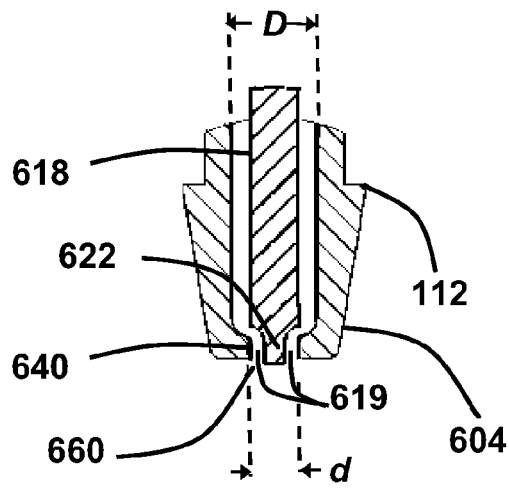
FIG. 6a is a close up cross sectional view of a conduit and manually activated ram in a filtering pose.
Figure 6A:
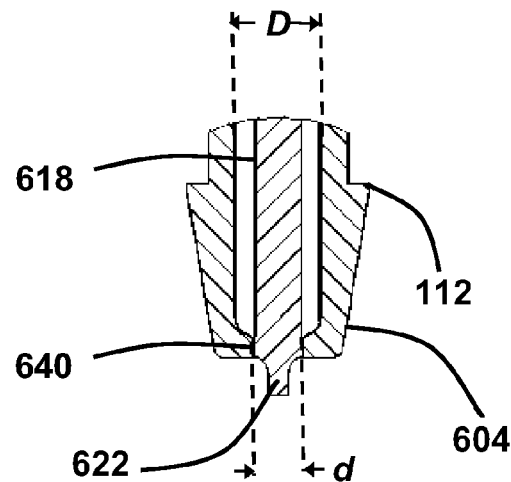
Figure 6B:
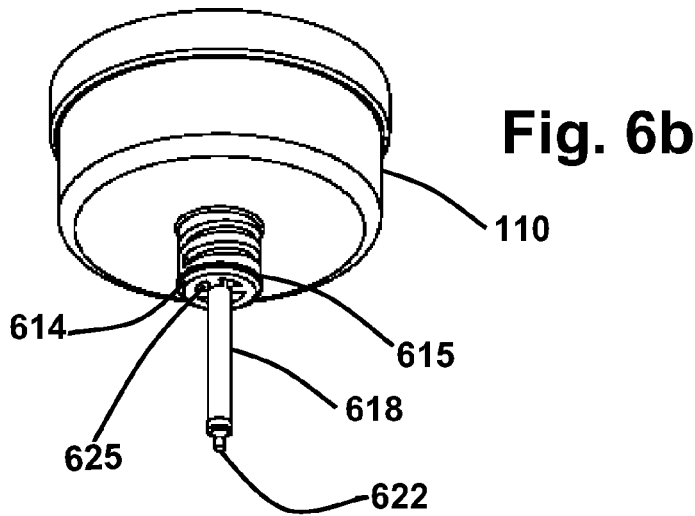
FIG. 6b is a perspective view of an emitter body, receiving port and manually activated ram.
Figure 6C:
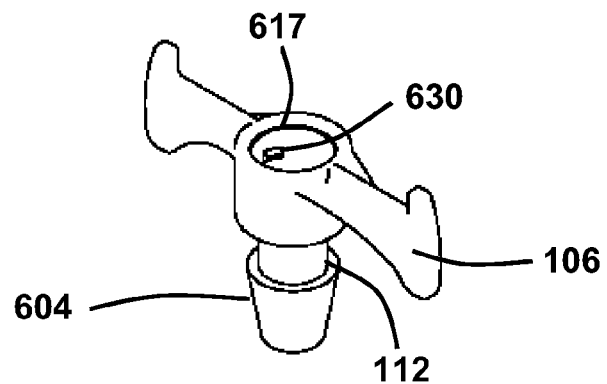
FIG. 6c is a perspective view of a conduit for a manually activated ram.

The embodiment of FIGS. 6a-c includes a filtering member 618, which is variably disposed with respect to a fluid inlet 660. In a filtering pose, filtering member 618 is retracted to allow fluid to flow through inlet 660. In a closed pose, a tip of filtering member 618 extends out and blocks inlet 660. When filtering member 618 moves from the retracted to the extended pose, it unclogs inlet 660, breaking up solid deposits and pushes particles out inlet 660.

FIG. 6a shows one possible embodiment of a cleaning apparatus in a filtering pose. In the filtering pose, a narrow channel 619 is formed between the tip of member 618 and the interior walls of an inlet slot 640. Particularly, in the example of FIG. 6a, member 618 narrows to a slender projection 622. In the filtering pose, projection 622 protrudes into slot 640 such that channel 619 has an annular shape. In the filtering pose, fluid may flow into inlet 660 but particles are retained at the entrance of narrow channel 619. In alternate embodiments member 618 may be tapered, slowly narrowing toward fluid inlet 660.

FIG. 6a' shows the same embodiment in a closed pose. In the closed pose, elongated member 618 extends through and blocks slot 640. When member 618 is moved from the filtering pose to the closed pose, it rams through slot 640. Ramming breaks solid deposits and pushes particles out from fluid inlet 660 into the fluid source (e.g. pipe 111, see FIG. 3c). In the example of FIGS. 6a-c, the diameter of the constriction at slot 640 is d for example between 1.0-3.0 mm and the diameter of the rest of the inner channel of conduit 604 is D for example between 2.5-4.0 mm. The diameter of member 618 is for example between 1.0 and 3.5 mm and the diameter of projection 622 is for example between 0.5-3.0 mm and the length of projection 622 is for example between 0.5-2.5 mm.

In order to clarify how the apparatus works, FIGS. 6b and 6c illustrate perspective views of two possible components of the emitter filter: a main body 110 and conduit 604 respectively. A threaded receiving port 614 extends from main body 110 to facilitate connection to conduit 604. Elongated member 618 projects from receiving port 614. Port 614 has several openings 625 for water communication between conduit 604 and main body 110.

Conduit 604 has an outlet 617 with an internal thread for connection to port 614. A thread tooth 630 limits the rotation of receiving port 614 within conduit 604. A sealing ring 615 prevents fluid leakage between port 614 and conduit 604.

The emitter operates in filtering pose when conduit 604 is screwed away from main body 110 as far as possible, until movement is stopped by thread tooth 630. Then, elongated member 618 and a slender projection 622 are retracted from slot 640 as illustrated in FIG. 6a and fluid can pass to the emitter though narrow channel 619

Screwing main body 110 toward conduit 604 switches the apparatus to closed pose. As main body 110 is screwed toward conduit 604, elongated member 618 is forced out slot 640. As member 618 passes through slot 640, it rams any trapped particles out slot 640. In a fully extended pose, member 618 closes slot 640 as illustrated in FIG. 6a'. Closing slot 640 may be useful when it is desired to cut off irrigation at the location of the emitter.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", an and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A drip irrigation apparatus to be attached to an irrigation hose with an inlet entrance inserted into the hose and with a body located outside the hose, the body including a drip outlet, the apparatus comprising:
   a) a conduit having a proximal end moveably connected to the body via a screw thread and a distal end including the inlet entrance, said conduit including:
      a step located on an exterior of said conduit between said inlet entrance and said proximal end connected to said body, wherein the exterior of said conduit is wider on a distal side of said step than on a proximal side of said step, said step sized and shaped for insertion through the wall of the irrigation hose into the irrigation hose for preventing elimination of the inlet entrance from the irrigation hose through the wall, and
      a channel providing fluid communication between said inlet entrance and said body, b) a ram, at least a portion of said ram shaped and positioned to move longitudinally inside said channel between said step and said inlet entrance to eject a particle located between said ram and said inlet entrance out from said inlet entrance into said irrigation hose, wherein said ram includes an elongated member rigidly attached to said body and long enough to pass through said channel to reach said inlet entrance, wherein a tip of said ram is configured to extend out said inlet entrance into said irrigation hose, c) a handle for rotating said conduit with respect to said screw thread via human manipulation thereby moving said conduit longitudinally with respect to said ram for said ejecting.

2. The apparatus of claim 1, wherein said conduit includes a constriction of the channel.

3. The apparatus of claim 2, wherein said ram is shaped and positioned to move longitudinally inside said channel from a first position between said constriction and said proximal end of the conduit toward said inlet entrance to a second position between said step and said inlet entrance, said second position also between said constriction and said inlet entrance, thereby ejecting said particle out from said inlet entrance into said irrigation hose.

4. The apparatus of claim 1, wherein said ram narrows toward said fluid inlet entrance.

5. The apparatus of claim 1, further including:
c) a handle for manually moving said fluid inlet entrance in respect to said ram.

6. The apparatus of claim 1, wherein said ram is further configured for closing said fluid inlet entrance.

7. The apparatus of claim 1, wherein said ram is configured to rotate with respect to said conduit.

8. The apparatus of claim 1, wherein said body includes a flow-restrictor restricting flow on a flow path between said conduit and said drip outlet.

9. The apparatus of claim 1 wherein said body further includes a receiving port connectible to said proximal end of said conduit, said receiving port and said conduit having respective circumferential couplers for sealingly rotatable mutual coupling, said ram including an elongated member extending from said receiving port to said inlet entrance, whereby a user rotates one member of said body and conduit relative to the other member such as to effect said ejecting.

10. The apparatus of claim 1 wherein said handle includes two opposing wings projected outwardly from said conduit such as to facilitate interacting with said conduit for controlling relative rotation of said body and said conduit.

11. The apparatus of claim 1, wherein said inlet entrance is flush with an outer edge of the apparatus.

12. The apparatus of claim 1, wherein said particle is sized between 0.3 to 0.5 mm and wherein said portion of said ram is movable to a location where said particle is washed away from the apparatus by external fluid flow in said hose.

13. The apparatus of claim 1 wherein said channel further includes a narrowing, said narrowing sized and shaped for filtering said particle from a fluid passing from said irrigation hose through said channel to prevent said particles from reaching said body; and wherein said at least a part of said ram is shaped and positioned to move longitudinally inside said channel from a first position between said narrowing and said proximal end of the conduit toward said inlet entrance to a second position between said step and said inlet entrance, said second position also between said narrowing and said inlet entrance, thereby ejecting said particle out from said inlet entrance into said irrigation hose.

14. The apparatus of claim 13, wherein said narrowing is formed between said ram and an inner surface of said conduit.

15. The apparatus of claim 14, wherein at least a portion of said narrowing is less than 2 mm from said inlet entrance.

16. The apparatus of claim 14, wherein a tip of said ram is configured to pass through said inlet entrance.

17. The apparatus of claim 13, wherein said narrowing has a maximum width of between 0.3 and 0.5 mm for trapping said particle of a diameter between 0.3 and 0.5 mm.

* * * * *